G. W. & R. CONNER.
CLUTCH.
APPLICATION FILED OCT. 2, 1915.
1,228,411.
Patented June 5, 1917.
2 SHEETS—SHEET 2.
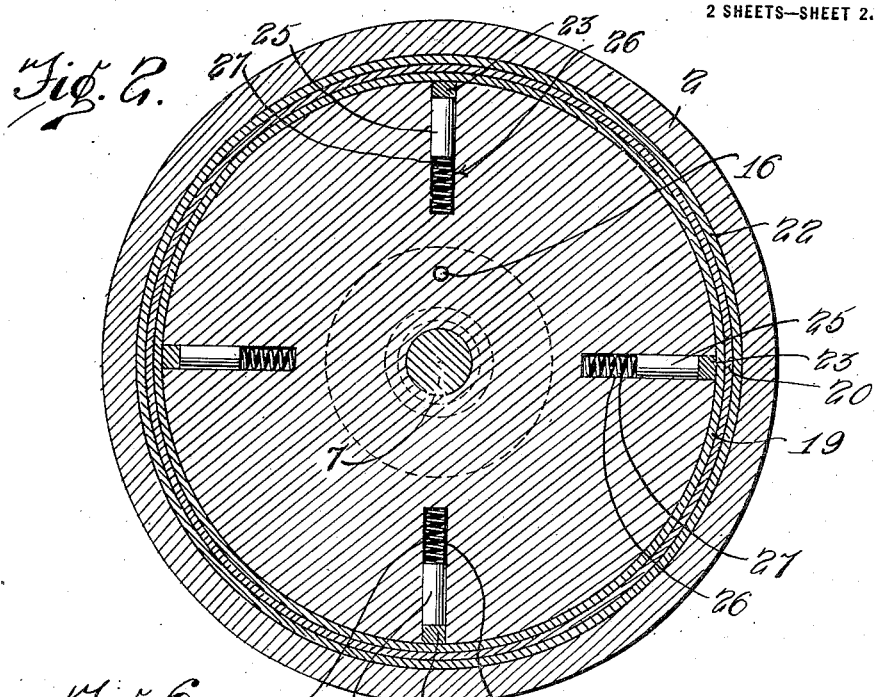
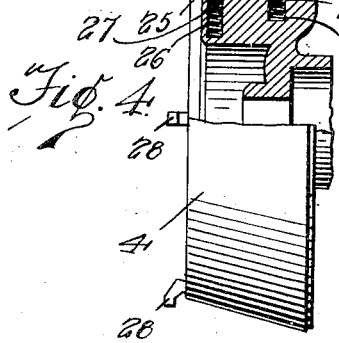
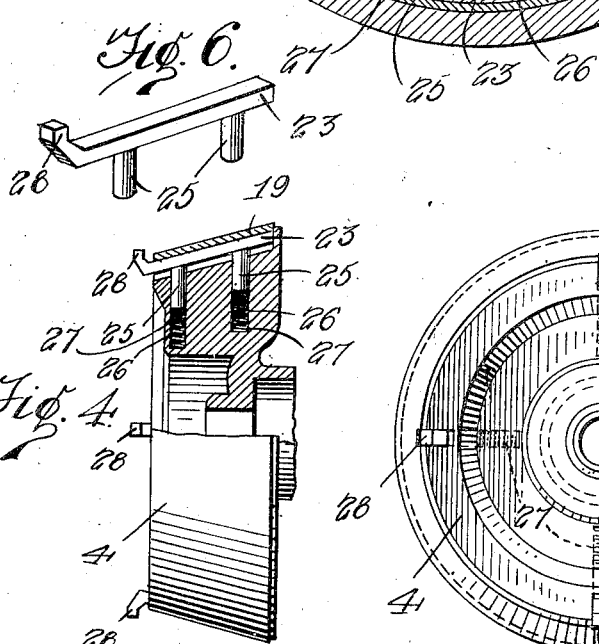
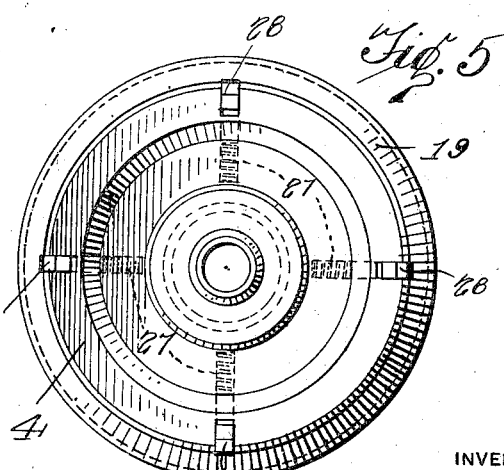
WITNESSES
C. R. Hardy.
W. S. Fowler.
INVENTORS
George W. Conner
Ray Conner
BY Richard B. Owen.
ATTORNEY

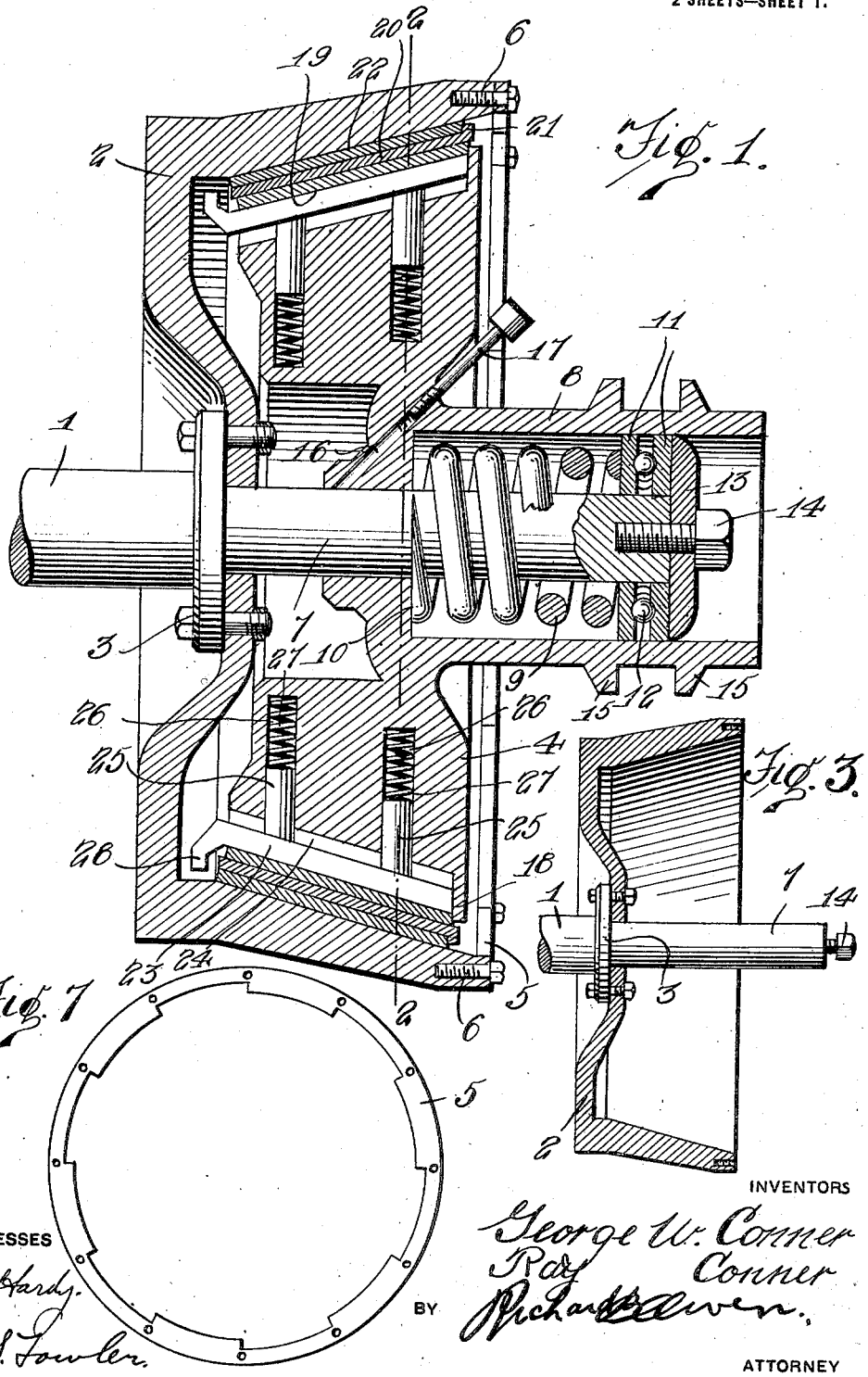

UNITED STATES PATENT OFFICE.

GEORGE W. CONNER AND RAY CONNER, OF MOUNT PLEASANT, IOWA.

CLUTCH.

1,228,411.          Specification of Letters Patent.      Patented June 5, 1917.

Application filed October 2, 1915. Serial No. 53,739.

*To all whom it may concern:*

Be it known that we, GEORGE W. CONNER and RAY CONNER, citizens of the United States, residing at Mount Pleasant, in the county of Henry and State of Iowa, have invented certain new and useful Improvements in Clutches, of which the following is a specification.

This invention has relation to certain new and useful improvements in clutches, and has for its primary object, the provision of improved form of cone clutch which may be employed in connection with the power shaft and flywheel of motor vehicles and the like and will be highly efficient in use.

The invention has for another object, the provision of a cone clutch of this character which will be of such construction and operation as to make it possible to gradually start or stop the vehicle with practically no liability of jerking or throwing forwardly the body of the vehicle.

The invention has for another object, the provision of a cone clutch of this character in which a friction sleeve or clutch sleeve will be provided between the cone and the flywheel to lock said cone and flywheel for rotation together when said cone is in operative position.

The invention has for a further object the provision of a cone clutch of this character which will be of such construction as to permit a limited transverse sliding movement of the cone sleeve or friction sleeve in either direction upon the cone, the cone or friction sleeve being adapted to move in one direction across the cone as the latter is moved to inoperative position and in the reverse direction as said cone is returned to operative position.

The invention has for still another object, the provision of a cone clutch of this character which will be of improved and simplified construction and operation and in which the cone or friction sleeve will be mounted in such manner between two flexible bands as to permit the cone to be gradually locked with or released from the flywheel during rotation of the latter.

With the above and other objects in view the invention resides in the novel construction, combination, and arrangement of parts as hereinafter set forth in the specification, pointed out in the claims and shown in the drawings, in which Figure 1 is a longitudinal section through the complete clutch, showing the cone and flywheel locked together and the cone in operative position;

Fig. 2 is a transverse sectional view on the plane of line 2—2 of Fig. 1;

Fig. 3 is a detail sectional view of the flywheel carried by the drive shaft;

Fig. 4 is an elevation of the cone and parts carried thereby, looking at the bevel face thereof and showing the cone partly in section.

Fig. 5 is a front elevation of the cone;

Fig. 6 is a detail perspective view of one of the cone band tightening members; and Fig. 7 is a detail elevation of the flywheel ring.

Referring more particularly to the drawings in which similar reference characters designate corresponding parts throughout the several views, 1 designates the drive shaft upon which the flywheel 2 is suitably secured as shown at 3, the flywheel 2 being of such form as to receive and practically inclose the cone 4. The flywheel 2 has a suitable ring 5 secured upon its large outer end as shown at 6, to prevent the cone 20 from being withdrawn from within said flywheel 2.

The end 7 of the shaft 1 upon which the cone 4 is mounted is preferably reduced in diameter, and the sleeve 8 of the cone 4 has a suitable helical spring 9 positioned therein and bearing against the end wall 10 at the inner end of said sleeve 8 and against one of the bearing washers 11 positioned in the opposite end of said sleeve 8 and having the bearing rollers 12 positioned therebetween, one of said bearing washers 11 resting against the washer 13 secured upon the free extremity of the reduced end 7 of the shaft 1, by the screw 14 or other suitable means. This will permit the spring 9 to serve to resiliently retain the cone 4 in its operative or innermost position within the flywheel 2, as shown in Fig. 1.

Suitable flanges 15 are formed upon the outside of the sleeve between which a clutch lever of conventional form may be engaged to move the cone 4 upon the reduced end 7 of the shaft 1 to its operative and inoperative positions and thereby throw in the clutch or throw out the same, as desired. The cone 4 has a suitable lubricant passage 16 formed therein and extending from its outer face through the hub thereof and having a suitable lubricant container 17 secured in its outer end, whereby the reduced end 7 of the shaft 1 may be properly lubricated.

The peripheral face of the cone 4 is suitably beveled toward its forward edge to correspond with the bevel of the opposing inner face of the flywheel 2 and the stop flange 18 is formed on the periphery of the cone 4 at the inner edge thereof.

Secured upon the beveled periphery of the cone 4 is a flexible band 19 formed of leather or other suitable material and resting upon the flexible band 19 is the cone or friction sleeve 20 having made of some rigid material, preferably metal an annular flange 21 formed at its upper or rear edge for engagement with the upper or rear edge of the flywheel engaging flexible band 22. This flexible band 22 is carried by and positioned upon the cone or friction sleeve 20 and is adapted to move with the same.

Beneath the first-mentioned flexible band 19 are positioned a plurality of spring controlled arms 23 which rest in transverse slots 24 formed in the beveled periphery of the cone 4 and having guide fingers 25 projecting from their inner faces and slidably engaged in the guide sockets 26 extending toward the longitudinal center of the hub of the cone 4 and having their outer ends communicating with the transverse slots 24. Suitable springs 27 are positioned in the bottoms of the guide sockets 26 and bear against the ends of the guide fingers 25 to force the same upwardly and thereby resiliently retain the arms 23 in engagement with the under face of the first-mentioned flexible band 19 whereby the arms 23 may serve to force portions of the flexible band 19 outwardly and into binding engagement with the under face of the cone or friction sleeve 20. The arms 23 also have their outer or rear ends engaged against the inner face of the annular flange 18, while their inner or forward ends 28 are turned outwardly in radial lines to prevent the cone or friction sleeve 20 and the flexible band 22 from sliding off the cone 4 as the same is moved longitudinally upon the reduced end 7 of the shaft 1 to inoperative position.

The flange 21 of the cone or friction sleeve 20 will also serve to limit outward movement of the cone 4 toward its inoperative position by engagement with the ring 5 carried by the flywheel 2 should the cone 4 be moved far enough in this direction.

In Fig. 1 the clutch cone 4 is shown in its innermost or operative position within the flywheel 2. Should the clutch be thrown out during rotation of the shaft 1, however, by withdrawing the cone 4 or moving the same to its inoperative position, it will be seen that the cone or friction sleeve 20 will move away from the flywheel 2 and the flange 21 of said cone or friction sleeve 20 will engage the flywheel ring 5, thereby releasing the cone or friction sleeve 20 from the cone 4 and causing said cone or friction sleeve 20 to move transversely upon the first-mentioned flexible band 19 until it engages the outturned ends 28 of the arms 23. It will be understood that should the cone or friction sleeve 20 and the flexible band 22 cling to the flywheel 2, as the cone 4 is drawn outwardly, the ends 28 of the arms 23 will serve to draw said cone or friction sleeve 20 and flexible band 22 away from said flywheel 2. It will also be seen that the springs 27 will cause the arms 23 to press the flexible band 19 against the cone or friction sleeve 20 at all times and thereby prevent rattling of the cone or friction sleeve 20, even when the cone 4 is in its outermost or inoperative position. As the cone 4 is again gradually moved inwardly to its operative position, the cone or friction sleeve 20 and the flexible band 22 carried by the same will engage the flywheel 2 and begin to take a rotary motion from the latter, and as the cone 4 continues to move inwardly, it is forced into the cone or friction sleeve 20 and as more tension is applied, the cone or friction sleeve 20 tightens upon the cone 4 until the vehicle is under way when the flywheel 2, cone or friction sleeve 20, and cone 4 are firmly locked together and will rotate as one.

It will be seen that, as the cone or friction sleeve 20 is of larger diameter than the cone 4, it has a greater area and consequently more gripping surface than the cone 4. The latter, therefore may be longer and have a slightly longer taper than the outer surface of the cone or friction sleeve 20 and increasing its gripping power. It is desirable, however, that the cone 4 should have slightly less gripping power than the cone or friction sleeve 20 to allow the latter to seat itself first.

From the foregoing it will be readily seen that this form of clutch will be easy on the transmission and differential gears as well as the tires and engine when employed upon motor vehicles or the like and the entire vehicle will be subjected to less strain and will not be jerked as the clutch is thrown in and out.

While the preferred embodiments of the invention have been clearly shown and described, it will be understood that minor changes in the details of construction, and arrangement of parts may be resorted to within the scope of the appended claims without departing from the spirit of the invention or sacrificing any of the advantages of the same. We wish to add, however, there should be some means of adjustment between the clutch and the operating means therefor which may be a hand lever or a foot lever, such adjustment being desirable to prevent the clutch being pulled back so far as to bind the sleeve between the disengaging ring and the ends of the lugs. Such adjustment which may be of any well known form is thoroughly understood and requires no illustration.

What is claimed is:

1. A clutch comprising a flywheel, a cone movable longitudinally within said flywheel, a flexible band carried by said cone, a friction sleeve resting upon said flexible band, and a flexible band carried by said friction sleeve for engagement with said flywheel when the cone is in operative position, said sleeve and the band surrounding the same being disconnected from each other, from the fly wheel and from the cone.

2. A clutch comprising a flywheel, a cone within said flywheel, a shaft for said flywheel, said cone being loosely mounted upon and adapted to move longitudinally on said shaft, a friction sleeve encircling said cone and disconnected therefrom, means for frictionally holding said sleeve on the cone from free circumferential movement but permitting limited longitudinal movement, said friction sleeve being adapted for engagement with said flywheel when said sleeve is in one position upon said shaft, and means for resiliently retaining said cone in said position upon said shaft.

3. A clutch comprising a flywheel, a cone within said flywheel, a friction sleeve mounted upon said cone and adapted to slide transversely of the same at times, means for limiting transverse sliding movement of said sleeve upon said cone, means for locking said friction sleeve against independent rotation upon said cone, said last-mentioned means also serving to prevent said friction sleeve from sliding off said cone, and means for resiliently retaining said cone in operative position.

4. A clutch comprising a flywheel, a cone within said flywheel, a shaft for said flywheel and said cone, said flywheel being rigid to said shaft, said cone being loosely mounted upon said shaft, a flexible band mounted upon said cone, a friction sleeve resting upon said band, a second flexible band carried by said friction sleeve for engagement with said flywheel when said cone and friction sleeve are in operative position, means carried by said cone to retain the first mentioned flexible band in binding engagement with said friction sleeve and prevent the latter from moving off the same, and means for resiliently retaining said cone in operative position.

5. A clutch comprising a fly-wheel, a cone movable longitudinally within said flywheel, a flexible band carried by and secured to said cone, a friction sleeve resting upon said flexible band, a flexible band carried by said friction sleeve for engagement with said fly-wheel when the cone is in operative position, said sleeve and the band carried thereby adapted to float between the cone and the fly-wheel when the clutch is disengaged, and resilient means on the cone for holding the sleeve from free rotation.

6. A clutch comprising a fly-wheel, a cone movable longitudinally within said flywheel, a flexible band carried by and secured to said cone, a friction sleeve resting upon said flexible band, a flexible band carried by said friction sleeve for engagement with said fly-wheel when the cone is in operative position, said sleeve and the band carried thereby floating between the cone and the fly-wheel when the clutch is disengaged and having limited independent movement in the line of movement of the cone, and means on the cone for preventing undue movement of said sleeve and band.

In testimony whereof we affix our signatures in presence of two witnesses.

GEORGE W. CONNER.
RAY CONNER.

Witnesses:
EARL C. HUEN,
J. T. BURNAP.